United States Patent [19]

Nations

[11] Patent Number: 4,844,175
[45] Date of Patent: Jul. 4, 1989

[54] TRACTOR TILLER HITCH

[76] Inventor: Richard E. Nations, 4423 Turnberry Ct., Douglasville, Ga. 30135

[21] Appl. No.: 95,142

[22] Filed: Sep. 11, 1987

[51] Int. Cl.[4] .............................................. A01B 33/08
[52] U.S. Cl. .................................... 172/680; 172/274; 172/42; 172/257; 280/482; 280/407
[58] Field of Search ................ 172/272, 274, 677, 679, 172/680, 776, 247, 60, 257, 42; 280/490 R, 482, 402, 490 A, 491 D, 461 A, 456 A, 407, 446 A

[56] References Cited

U.S. PATENT DOCUMENTS

| | | | |
|---|---|---|---|
| 1,318,819 | 10/1919 | Broeck et al. | 280/490 R |
| 3,031,208 | 4/1962 | Abbott | 280/461 A |
| 3,281,163 | 10/1966 | Wiebee | 280/491 D |
| 4,066,131 | 1/1978 | Zandbergen | 172/680 |
| 4,424,868 | 1/1984 | Staniforth et al. | 172/257 |
| 4,600,070 | 7/1986 | Thurner | 172/272 |

Primary Examiner—Deborah L. Kyle
Assistant Examiner—J. Woodrow Eldred
Attorney, Agent, or Firm—Michael C. Smith

[57] ABSTRACT

A hitch for connecting the rear of a garden tractor to the rear of a garden tiller of the type having one or more tines which rotate in the direction of normal travel of said tiller comprising a beam, a bracket and an arm aligned in an adjustable triangular shape being in a substantially vertical plane for the controlled pulling of the tiller by the tractor in a direction opposite to the direction of rotation of the tiller tines thereof.

7 Claims, 2 Drawing Sheets

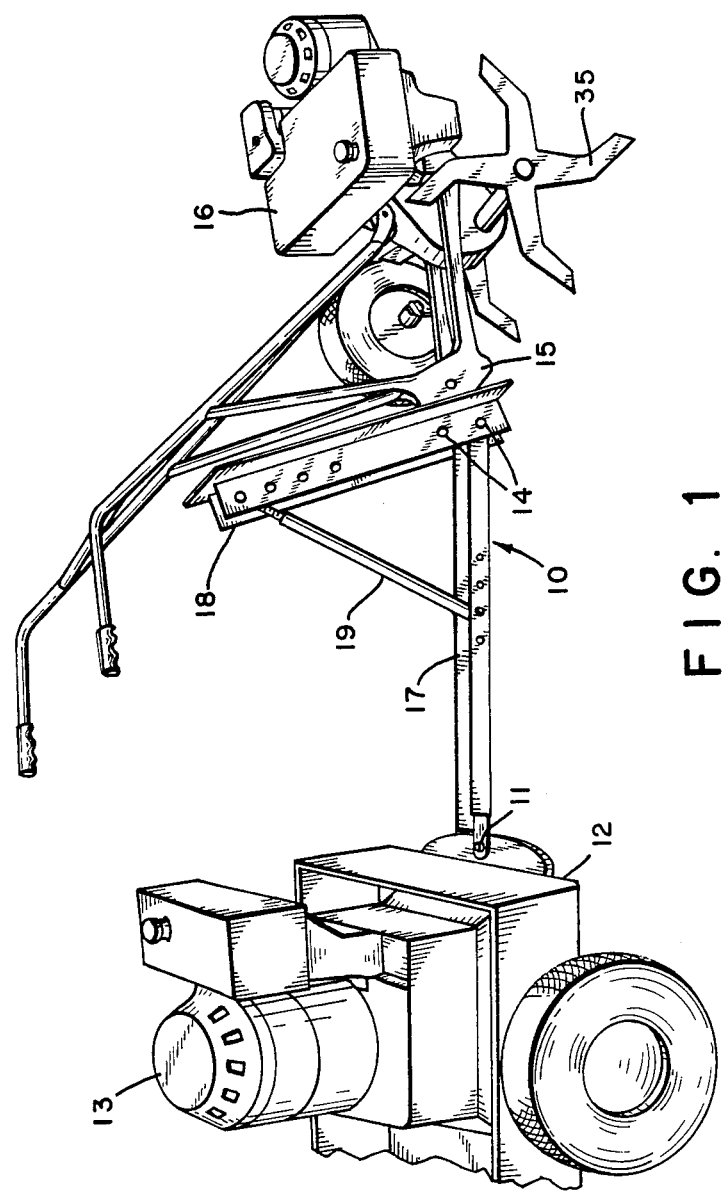

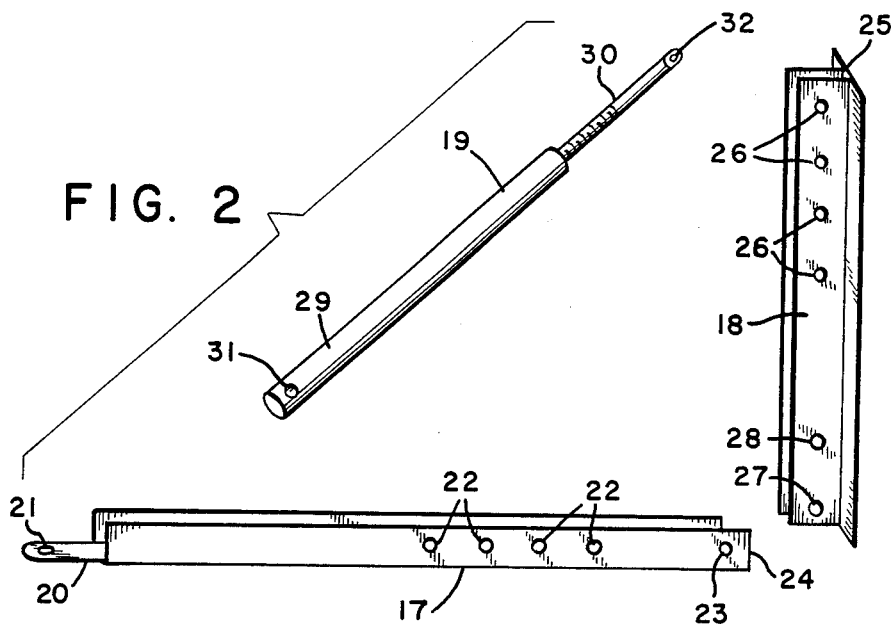
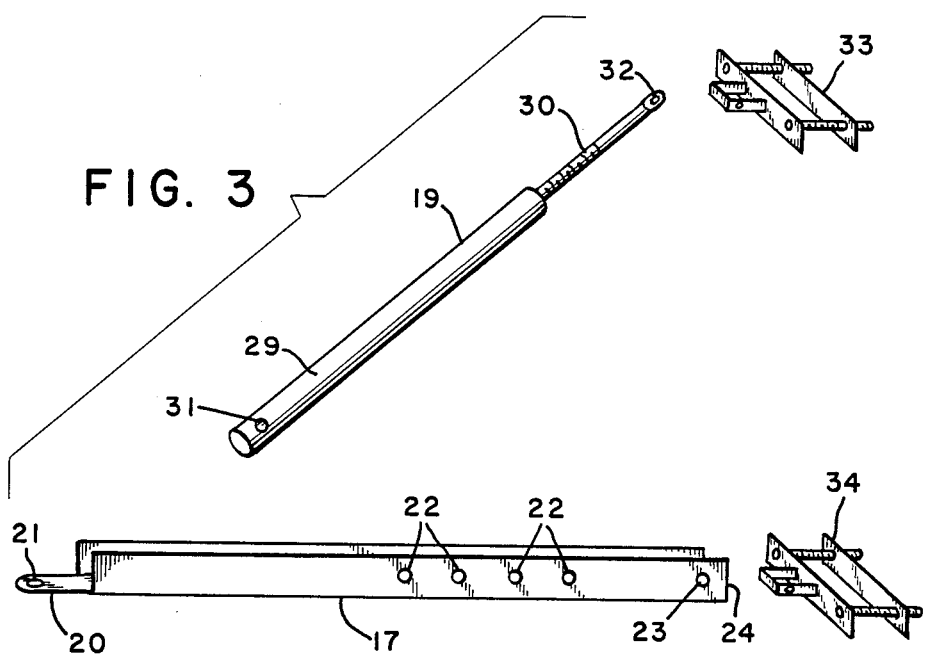

TRACTOR TILLER HITCH

TECHNICAL FIELD

The present invention relates generally to lawn and garden equiptment, specifically to a garden tiller, and more specifically to a tiller hitch for connecting a garden tiller to a garden tractor or similar device.

BACKGROUND ART

Hitches are well known in the art. Examples are shown in U.S. Pat. Nos. 1,960,132; 2,210,792; 1,713,476; 680,267; 2,981,345; 1,552,756; 1,260,242; and 1,475,956.

While the varieties of hitches shown are apparently well suited for the purposes expressed in the above referenced patents, until the present invention there has been no hitch for use in connecting a garden tractor or riding mower and a tiller of the type having two or more front rotating tines to allow for the pulling of the tiller in a direction opposite to the direction of its normal plowing movement. It is for this reason that the present tractor tiller hitch was invented.

DISCLOSURE OF INVENTION

The present invention promotes quick, easy, thorough plowing of soil.

The present invention is a tractor tiller hitch having a beam adapted to be secured to the tractor, a bracket pivotally secured to the end of the beam away from the tractor and adapted for attachment of a tiller thereto, and an adjustable idler arm securred to the beam and to the bracket, adapted to control the angle of alignment between the bracket and the beam.

Thus, a primary object of the present invention is to provide a means for securing a front tine type garden tiller to a garden tractor for pulling the tiller through soil in a direction opposite to the normal plowing direction of the tiller.

Another major object of this invention is to provide a tractor tiller hitch having a beam, a bracket, and an adjustable idler arm, all interconnected, forming a triangular hitch which is aligned in a substantially vertical plane when in use as described above.

BRIEF DESCRIPTION OF THE DRAWINGS

While the specification concludes with claims particularly pointing out and distinctly claiming the subject matter which is regarded as the invention, it is believed that the invention, objects, features, and advantages thereof will be better understood from the following description taken in connection with the accompanied drawings in which like parts are given like identification numerals and wherein:

FIG. 1 is perspective of the present invention attached to a tractor and a tiller;

FIG. 2 is an exploded view of the present invention showing the three major components thereof; and FIG. 3 is an exploded view of the present invention showing an alternate bracket configuration thereof.

BEST MODE FOR CARRYING OUT THE INVENTION

While there are many ways of connecting equipment to a tractor, the method used in connection with the present invention is by means of the present tractor-tiller hitch. This apparatus is illustrated in FIG. 1, showing the hitch generally at 10. Hitch 10 is connected at one point 11 to the rear 12 of a garden tractor 13. It is connected at one or more points 14 to the plow holder 15 of the tiller 16.

For purposes of this specification, a garden tractor is defined as a small tractor, of the type often referred to as a riding lawn mower, and a tiller or garden tiller is referred to as a tiller of the type having one or more tines which rotate in the direction of normal travel of the tiller while being restrained by a plow or drag foot which is forced into the soil, thereby causing the tines to cultivate soil to a desired depth by rotation of the tines in the soil.

As FIG. 1 of the drawings illustrates, the preferred embodiment of the present tractor-tiller hitch comprises a main beam 17, a mounting bracket 18, and an idler arm 19. These three components are arranged in a basically triangular fashion which is disposed in a substantially vertical plane.

Referring now to FIG. 2, it can be seen that main beam 17 is an elongated metal beam having a hitch end 20 through which a vertical hitch aperture 21 is inscribed. The hitch aperture 21 is adapted for securement to the rear 12 of a tractor 13 while allowing beam 17 to pivot on the point of contact 11 with the tractor 13 and rotate from side to side in a horizontal plane. A plurality of idler arm attachment means in the form of horizontal beam apertures 22 are inscribed in beam 17, which will be discussed below. A beam mounting means 23 in the form of a horizontal aperture is inscribed in beam 17 near its tiller end 24. Mounting bracket 18 is an elongated metal member having a plurality of idler arm attachment means near it's top 25 in the form of horizontal bracket apertures 26 which will be further discussed below. Also inscribed within bracket 18 are a bottom horizontal aperture 27 which is set in alignment with beam mounting aperture 23 and jointly penetrated by a bolt or similar interconnection device. Slightly above bottom aperture 27 is a horizontal tiller aperture 28 inscribed in bracket 18 for connection of bracket 18 to tiller 16 by aligning aperture 28 with a similar aperture in plow holder 15 and jointly penetrating them with a bolt or similar interconnection device. In the alternative, bracket 18 can be divided into two separate brackets, an upper bracket 33 and a lower bracket 34, as shown in FIG. 3, which connect to existing hardware of the tiller 16, such as a plow holder 15 or a conventional elongated drag foot. The triangular configuration is maintained as discussed. Idler arm 19 comprises a cylindrical metal outer member 29 having a threaded interior and an inner threaded rod 30 which is screwed into outer member 29. Rotation of either member 29 having a variation in the overall length of arm 19, thereby providing for adjustment. A bottom eyelet 31 is aligned with a beam aperture 22 and is securred thereto by a bolt or similar device. Proper length of arm 19 is adjusted as previously discussed, and eyelet 32 is aligned with a bracket aperture 26 and securred thereto by a bolt or similar device. The three components 17, 18, 19 form a substantially vertical triangle with beam 17 substantially horizontal and bracket 18 adjustably securred thereto to control the proper depth of cut of the tines 33 of the tiller 16.

While this invention has been described in detail with particular reference to a preferred embodiment thereof, it will be understood that variations and modifications can be effective within the spirit and scope of the invention as described hereinbefore and as defined in the appended claims.

INDUSTRIAL APPLICABILITY

This invention is capable of exploitation in the garden equipment industry and is particularly useful in interconnection of a garden tractor and a garden tiller for pulling of the tiller by the tractor.

I claim:

1. Apparatus for interconnecting a rear portion of a garden tractor to a rear portion of a garden tiller of the type having one or more rotating tilling tines which rotate in the direction of the normal forward travel of the tiller, comprising:
   (a) a substantially horizontal rigid beam having a first end thereof securable to the rear end of a garden tractor;
   (b) a rigid tiller mounting bracket rotatably secured to a second end of said beam, said bracket being rotatable only in a vertical plane;
   (c) a rigid idler arm having an adjustable overall length and having a bottom end connectable to said beam and a top end connectable to said bracket; and
   (d) a tiller connection means located on said bracket between its points of contact with said beam and said idler arm;
   (e) further porivided that said beam, bracket and idler arm form a triangular shape disposed in a substantially vertical plane.

2. The apparatus of claim 1 wherein said beam comprises means for securement thereof to the rear of a garden tractor which permits rotation of said beam from side to side within a substantially horizontal plane.

3. The apparatus of claim 2 wherein said beam comprises a plurality of idler arm attachment apertures inscribed in said beam in a horizontal manner which are each perpendicular to the longitudinal axis of the beam.

4. The apparatus of claim 1 wherein said bracket comprises a plurality of idler arm attachment apertures inscribed in said bracket in a horizontal manner which are each perpendicular to the longitudinal axis of the bracket.

5. The apparatus of claim 1 wherein said idler arm comprises a cylindrical outer member having a threaded interior and an inner rod having a threaded exterior which is screwed into said outer member by means of said threaded surfaces such that rotation of either the outer member or the inner rod causes variations in the length of said idler arm.

6. The apparatus of claim 5 wherein said idler arm comprises a lower eyelet for securing said idler arm to said beam and an upper eyelet for securing said idler arm to said bracket.

7. Apparatus for interconnecting a rear portion of a garden tractor to a rear portion of a garden tiller of the type having one or more rotating tilling tines which rotate in the direction of the normal forward travel of the tiller, comprising:
   (a) a substantially horizontal rigid beam having a first end thereof securable to the rear end of a garden tractor;
   (b) a rigid tiller mounting bracket rotatably secured to a second end of said beam, said bracket being rotatable only in a vertical plane;
   (c) a rigid idler arm having an adjustable overall length and having a bottom end connectable to said beam and a top end connectable to said bracket; and
   (d) a tiller connection means located on said bracket between its pooints of contact with said beam and said idler arm;
   (e) further provided that said bracket comprises a first upper bracket with an idler arm attachment aperture inscribed in said upper bracket in a horizontal manner, perpendicular to the longitudinal axis of the upper bracket, and a second lower bracket with a beam attachment aperture inscribed in said lower bracket in a horizontal manner, perpendicular to the longitudinal axis of the lower bracket, and said brackets are securable to existing hardware of said tiller.

* * * * *